Figure 1:
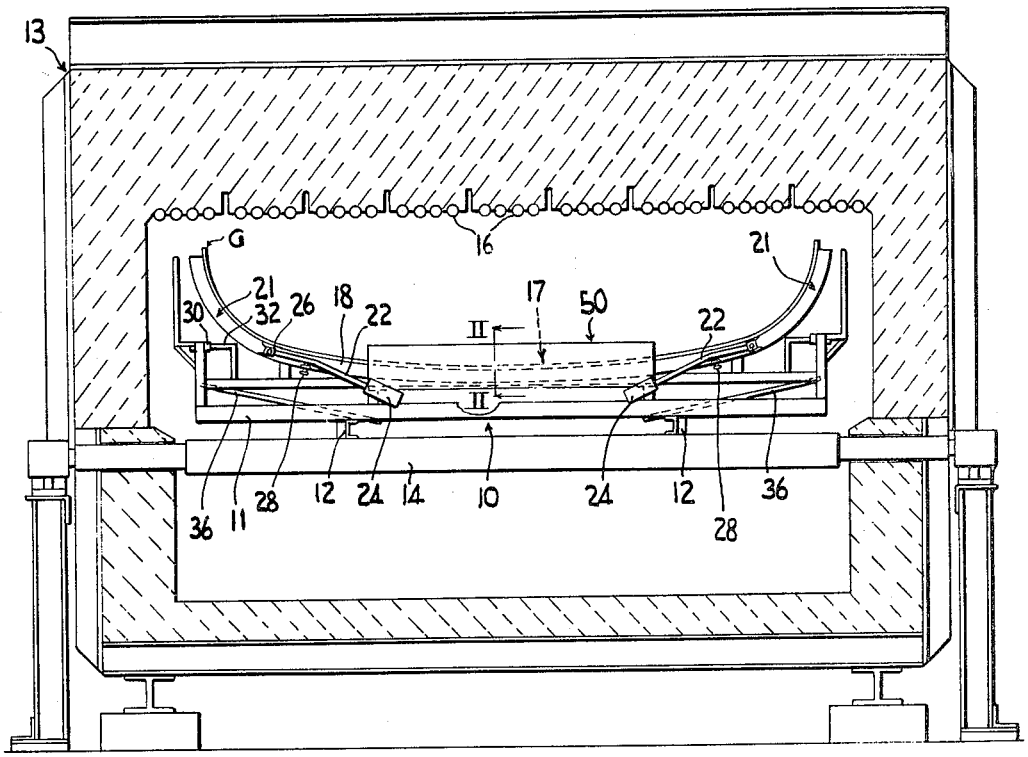

Sept. 14, 1965  P. D. SHAFFER ETAL  3,206,294
METHOD OF TREATING GLASS SHEETS
Filed Dec. 1, 1961  2 Sheets-Sheet 1

INVENTORS
PAUL D. SHAFFER and
THOMAS J. REESE
BY Oscar L. Spencer
ATTORNEY

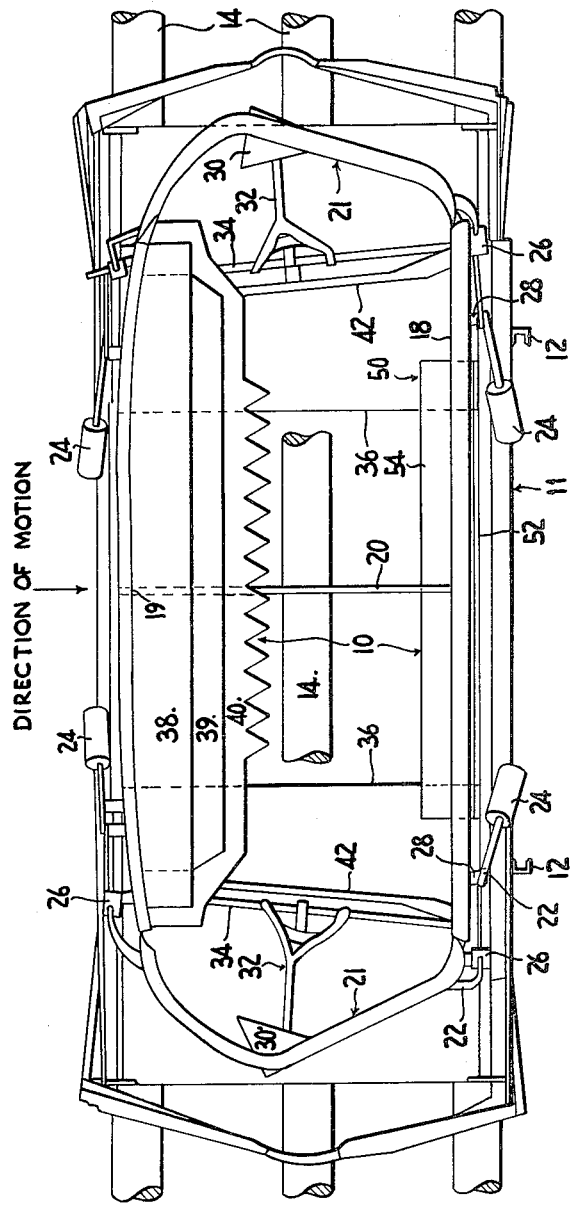

United States Patent Office 3,206,294
Patented Sept. 14, 1965

3,206,294
METHOD OF TREATING GLASS SHEETS
Paul D. Shaffer, New Kensington, and Thomas J. Reese, Natrona Heights, Pa., assignors to Pittsburgh Plate Glass Company, Pittsburgh, Pa., a corporation of Pennsylvania
Filed Dec. 1, 1961, Ser. No. 156,434
4 Claims. (Cl. 65—103)

This application is a continuation-in-part of application Serial No. 732,677 now abandoned of Paul D. Shaffer and Thomas J. Reese, filed May 2, 1958, for Treating Glass Sheets.

The present invention relates to treating glass sheets, and specifically is concerned with the control of stresses along the marginal edge of bent glass sheets.

Glass sheets are currently bent to produce bent, laminated automobile windshields by mounting the sheets in pairs on sectionalized, skeletonized molds whose sections are composed of one or more edgewise disposed rails whose upper edges conform to the shape desired for a portion of the bent glass. The sections move into a spread mold position for receiving flat glass sheets for bending and tend to move into a closed mold position wherein the upper edges of the rails provide a substantially continuous shaping surface conforming in elevation and outline to the shape desired for the bent glass sheets, but slightly smaller than the peripheral outline thereof.

In present commercial windshield production, the glass sheets are preferably cut to the outline of the ultimate windshield before they are mounted for bending. This cutting treatment exposes the edge and narrow marginal area of the glass sheet to the temperature cycle incidental to bending and annealing. Such edge exposure imposes a desirable stress pattern in the glass edge and marginal area extending beyond the outline of the mold rails.

The glass-laden molds are conveyed transversely through a tunnel-like bending and annealing lehr having different temperature zones. The first of these zones is a preheat zone wherein the temperature of the glass is raised to substantially its deformation temperature (about 980 degrees Fahrenheit or above for most plate glass and sheet glass compositions having a nominal thickness of about one-quarter inch).

Beyond this zone is a bending zone wherein the glass is heated to even higher temperatures, with especially intense heat applied to the regions to be bent more sharply than other regions. When the glass temperature exceeds about 1100 degrees Fahrenheit, the softening of the glass of the thickness specified reduces the resistance of the glass sheet against the tendency of the mold sections to move into the closed mold position. At these elevated temperatures the combination of heat sagging and upward lifting or folding causes the glass to conform to the mold shaping surface formed at the upper edges of the mold rails which comprise the mold section.

The bent glass sheets are then conveyed through an annealing zone having successive regions of progressively lower temperature. The temperature of the succeeding regions and the rate at which the bent glass sheets are conveyed through the annealing zone controls the rate at which the different regions of the glass sheets cool through the annealing range of glass. The relation of cooling rates in different regions of the glass through the annealing zone establishes controlled stresses in the glass.

Many of the successive zones in the lehr through which the glass sheets are conveyed during the bending and annealing operation provide a non-uniform temperature pattern transverse to the path of glass movement. The temperature of each zone is different from that of its immediately adjacent zone. Hence, each glass sheet is continuously subjected to a non-uniform temperature pattern extending both along and transverse to the path of movement of the glass sheet.

After the glass sheets are bent, they are conveyed through an annealing zone having successive zones of progressively decreasing temperature including temperatures through and below the annealing range of glass, which is generally accepted as between about 1040 degrees Fahrenheit and about 950 degrees, Fahrenheit for soda-line glasses such as plate glass and sheet glass. Permanent stress patterns are established in the glass when it is cooled through its annealing range. The magnitude of these stresses depends upon the relative rates at which the different regions of the glass sheets cool through the annealing range. The velocity of the glass sheets moving through the successively cooler temperatures of the annealing zone and the temperature gradient along the path of movement determine the magnitude of these stresses when glass sheets are conveyed on skeletonized bending molds according to the practice established in the prior art.

Since mass production requires the fastest possible rate of production of windshields, the flat glass industry has attempted to increase its production rates by moving the glass sheets as rapidly as possible through the bending lehrs. Rapid movement imposes steeper temperature gradients than slower movement. The steeper the temperature gradient in the glass sheets, the greater are the stresses that are established between the glass edge and the portion in contact with the mold rail.

It is desired by the automotive manufacturers that the windshields produced for the vehicles be as free as possible from susceptibility to spontaneous fracture. It has been determined that this objective can be met by controlling the maximum internal tension stress of the glass to an upper limit of below 1,000 pounds per square inch.

When glass sheets are bent on skeletonized sectionalized molds, the outline of the bent glass extends slightly beyond the outline of the closed mold, up to about one-quarter inch. After bending the exposed glass sheet edge cools relatively rapidly, whereas the thin band of glass about one-quarter inch to three-eighths inch laterally inwardly thereof in contact with the mold rail has its heating rate retarded.

The combination of relatively rapid cooling of the glass sheet edges and the retarded rate of cooling of the portions in contact with the mold rail causes the glass edge to be stressed in compression and the portion immediately inward of the glass margin to be stressed in tension. As long as a skin of compression stress surrounds an interior stressed in tension, no harm results. However, once the skin of compression stress is pierced, as by a fine surface scratch, the magnitude of the internal tension stress determines whether the surface scratch heals or deteriorates into a serious vent.

The criterion of a maximum tension stress of 1,000 pounds per square inch has been established as the upper limit of tension stress permitted to enable the bent glass sheet to be relatively invulnerable to spontaneous breakage resulting from surface scratches. If the maximum tension stress in the region adjacent the peripheral edge of the glass sheet is controlled to this maximum, surface scratches heal themselves rather than cause vents.

Previous work on the manufacture of bent glass sheets has determined that the best orientation of the glass sheets for conveyance through a bending lehr involves moving the glass sheets transversely. This technique results in establishing a thermal gradient between the exposed longitudinal side edge and the portion immediately adjacent the longitudinal side edge that contacts a mold rail forming a longitudinal side edge of the mold shaping surface.

Air drafts flowing longitudinally of tunnel-like lehrs tend to steepen the thermal gradient between the exposed edge and the portion contacting the mold rail subsequent to bending. Drafts have been minimized by providing curtains and/or doors that enclose the entrance and exit of the lehrs.

An obvious solution for the problem of controlling stresses resulting from successive changes of temperature of exposure would be to reduce the speed at which the glass sheets move through the bending lehr, thus reducing the thermal gradients which produce the elevated stresses within the glass. However, the insatiable appetites of the automobile manufacturers for bent windshields makes it necessary to maintain a high rate of production. The present invention provides a solution wherein the tension stresses in the region immediately adjacent the longitudinal side edge of the glass sheets are minimized, while permitting a high rate of windshield production.

The present invention also provides a solution involving relocating the regions of tension stress so that the areas stressed in tension are located a relatively large distance from the edge of the glass, preferably several times the distance that inherently occurs when the glass sheet edge overlaps the margin of the peripheral shaping surface of the bending mold by about one-quarter inch as in conventional bending operations.

According to the present invention, the stresses in and adjacent the side edges of the glass sheets supported on a skeletonized bending mold for bending are controlled within satisfactory levels by maintaining a stress modifying member extending lengthwise of the mold substantially parallel to and located adjacent a portion of one or both side edges of the glass sheet transported laterally through a bending and annealing lehr. The stress modifying member is preferably made of metal, such as stainless steel, and includes a portion maintained in a plane spaced a slight distance outward and substantially parallel to a side edge of the glass sheet and another member located slightly below and extending in a plane substantially parallel to the bottom surface of the glass inward of the side edge a distance sufficient to relocate the zone of tension stress within the glass to at least one inch inwardly of the glass edge.

In a particular illustrative embodiment of the present invention, the stress modifying member is substantially L-shaped in cross section and comprises a horizontally oriented metal member disposed beneath a portion of one of the center section rails that support a longitudinal side edge of the glass sheet after bending and extends transversely from outside the rail to inside the rail. The stress modifying member of this embodiment also incorporates a vertically oriented metal member that extends in a vertical plane from a bottom outer corner formed with the horizontally oriented member to above the portion of the upper shaping surface provided by the center section rail laterally adjacent thereto.

The dimensions, that is the area and thickness, of the stress modifying member are so chosen relative to the area of the glass adjacent thereto and the thickness of the glass sheet so as to have a moderating effect on the heating and cooling rates of the adjacent area of the glass sheet in order to provide the desired result according to the objects of the present invention.

The thermal capacity of the stress modifying member is so distributed relative to the adjacent mold portion that it has a greater moderating effect on the natural rate of cooling at the edge portion and a lesser moderating effect on the natural rate of cooling in an area extending inward from the edge portion while not substantially affecting the cooling rates of other glass sheet portions not adjacent thereto. To accomplish this, a considerable portion of the mass of the L-shaped member is distributed adjacent and outside of the mold rail to provide a relatively greater temperature moderating effect in the vicinity of the exposed glass edge adjacent thereto and the remainder of the mass is distributed in alignment with an extended area inward of the mold rail to provide a lesser but significant moderating effect in said area and substantially no temperature moderating effect elsewhere. The thermal capacity of a member, as used herein, refers to its property of thermal absorption.

Figure 2:
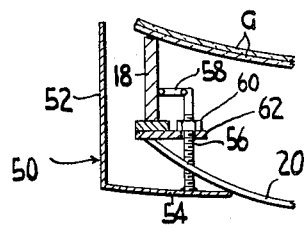

The present invention will be understood much more thoroughly upon studying the description of an illustrative embodiment which follows. In the accompanying drawings which form part of the disclosure, FIG. 1 is a sectional view of a portion of a bending lehr showing a bending mold provided with a stress-modifying member according to the present invention;

FIG. 2 is a fragmentary, enlarged, sectional view of a portion of the construction shown in FIG. 1 taken along the lines II—II thereof; and FIG. 3 is a plan view of a bending mold provided with the stress modifying member in accordance with the present invention.

In the drawings, reference number 10 refers generally to a bending mold of stainless steel that is mounted on a mold support carriage 11. The mold support carriage includes carriage rails 12 extending transversely thereof.

A lehr 13 is shown in cross-sectional view in FIGURE 1. This lehr is of the conventional tunnel-type and includes conveyor rolls 14 which rotate and support the carriage rails 12 for moving the mold 10 and the carriage 11 transversely through the lehr. Overhead heaters 16 are provided in the lehr above the path of movement of the molds 10 along conveyor 14 to supply the heat necessary to raise the temperature of glass sheets supported on the mold to the glass deformation temperature.

The sectionalized mold 10 includes a center mold section 17 including spaced rails 18 and 19 of stainless steel disposed edgewise. Rails 18 and 19 extend longitudinally of center mold section 17. Their upper surfaces conform to the center portions of the longitudinal side edges of the glass shaping surface.

Rail 18 is constructed to support a portion adjacent the leading side edge of the bent glass sheet and rail 19 is constructed to support a portion adjacent the trailing side edge of the bent glass sheet. The terms "leading side edge" and "trailing side edge" refer to the orientation of the sheet passing through the lehr.

A curved reinforcing rod 20 interconnects the rails 18 and 19 of the center mold section 17. Rod 20 is located a sufficient distance below the shaping surface to minimize the effect of its thermal capacity on the temperature changes in the portion of the glass sheet located thereabove as the glass is subjected to the temperature cycle incidental to bending.

Flanking the center mold section are end mold sections 21 which comprise edgewise disposed curved rails of stainless steel adapted to move into the closed mold position depicted in FIGURES 1 and 3 to provide with the rails 18 and 19 of the center mold section 17 a substantially continuous frame conforming in elevation and outline to the shape desired for the bent glass sheet. Crooked lever arms 22 having counterweights 24 attached to their longitudinal inner portions are attached to the end mold sections 21 and are rotatable about pivot brackets 26 carried by the center mold section 17.

Stops 28 are attached to the bottom of rails 18 and 19 and extend laterally beyond the substantially vertical planes of travel taken by lever arms 22. When the lever arms 22 rotate into contact with the stops 28, the end mold sections 21 are prevented from rotating beyond the orientation desired for the closed mold position.

Heat absorber members 30, of a material having relatively high thermal capacity compared to glass such as steel, are mounted on support structures 32 cantilevered to additional support rods 34. The purpose of the heat absorber members 30 is to abstract heat from the region adjacent the tips of the glass sheet when the flat glass sheets are mounted on the bending mold held in the spread mold position. Therefore, the extremities of the glass sheet are kept at a lower temperature than the areas of the sheet slightly inboard thereof which are to be bent to severe curvatures.

As the glass sheet is folded upwardly upon the rotation of the end mold sections 21 about the pivots provided by the pivot brackets 26, the glass sheet extremities move away from the heat absorber members 30, thereby lessening the temperature moderating effect of the heat abstractors on the affected portions of the glass sheet, thereby permitting the glass sheet extremities to reach temperatures within the annealing range but below the softening point. Therefore, while the glass sheets are bent to non-uniform curvatures including relatively flat extremities, the glass sheet extremities are permitted to reach a sufficiently high temperature to permit the entire glass sheet to anneal properly without inducing steep thermal gradients tending to induce glass fracture resulting from thermal shock.

Absorber plates 36 of large thermal capacity are carried obliquely by the carriage 11 to protect the undersurface of the glass sheet from reradiation of heat from the conveyor rolls 14 when the conveyor rolls extend continuously across the lehr. Such reradiation is liable to cause the bottom sheet to heat more rapidly than the top sheet and thereby form a gap between the two sheets undergoing simultaneous bending.

Additional heat absorber plates 38, 39, 40 of large thermal capacity per unit area compared to an equivalent area of glass, are located in the central portion of the mold adjacent the trailing side edge supporting rail 19. These additional plates extend laterally inwardly of rail 19 toward rail 18 in a plane below the bottom edge of rail 18 to maintain the portion of the glass sheets supported thereover at a temperature lower than the remainder of the glass. These plates are constructed to have sufficient thermal capacity to permit the glass to reach a temperature below the softening point but within the annealing range when the portions undergoing bending reach glass softening temperatures.

These central absorber plates 38, 39, and 40 are mounted in echelon to provide a varying heat absorbing effect so as to minimize the temperature gradients between the regions of the glass sheet remote from any heat absorber members and those that are adjacent the heat absorber members. Transversely extending supports 42 are provided to carry the central heat absorber plates 38, 39, and 40. The heat absorber plates may be composed of heavy metal or metal alloy such as steel.

In order to insure that a proper stress pattern is established in the leading edge of the glass sheet traversing the bending lehr, a stress modifying member 50 of stainless steel which comprises a first portion in the form of a vertically oriented wall member 52 and an additional portion in the form of a horizontally oriented wall member 54 is provided to embrace the central portion of leading center mold section rail 18 in advance of and below the leading side edge of the glass. Vertical wall member 52 is spaced from rail 18 and extends upward in a vertical plane parallel to a plane including rail 18 from below the bottom of rail 18 to slightly above the shaping surface of rail 18. Horizontal wall member 54 is attached to the bottom extremity of the vertical wall member 52 to form a corner therewith and extends in a horizontal plane below leading center mold section rail 18 laterally inwardly thereof.

An externally threaded rod 56 is attached at its bottom to horizontal wall member 54 by welding as shown in FIGURE 2. A link 58 interconnects the upper edge of the threaded rod 56 with center section rail 18. A lock nut 60 is threadedly mounted to threaded rod 56 and bears against the upper surface of an apertured tab 62 fixed to rail 19. Rotation of the lock nut 60 adjusts the vertical position of the stress modifying member 50 relative to rail 18. Elements 55, 58, and 60 serve as means interconnecting the stress modifying member 50 to the rail 19 for maintaining the stress modifying member in fixed spaced relation to the mold rail.

Stress modifying members having only a horizontal member failed to produce the necessary stress pattern in the leading edge of the glass sheets. However, the combination of the mutually perpendicular vertical and horizontal wall members 52 and 54 as depicted in the present invention has resulted in establishing a desirable stress pattern in the glass. The internal tension stress formerly located in a narrow band spaced between one-quarter to three-eighths inch inside the glass edge was reduced from a range of 2000 to 3000 pounds per square inch to a range of 800 to 1200 pounds per square inch. Also, the area of tension stress was relocated to at least one-half inch from the glass edge, at least twice the distance obtained without such members. Glass plates less vulnerable to breakage from scratches in this region were produced commercially at improved yields using such members.

The reason why the particular structure produces an improved stress pattern is believed to result from the lessening of the temperature gradient between the leading side edge and the portion immediately laterally within the leading edge. The vertical member is believed to provide necessary shielding against cooling by air currents within the lehr and also sufficient thermal capacity for retarding the natural rate of cooling of the exposed peripheral margin of the glass sheets supported after bending while the horizontal member removes heat locally from a relatively wide band of glass immediately laterally within the side edge formerly subjected to high internal stresses. This diminishes the effect of the mold rail to retard the cooling rate of the glass portion it contacts and the portion adjacent thereto.

The width of the horizontal member extends the area of temperature control from the narrow band formerly controlled by the mold rail to a wide band. Thus, the rates of cooling adjacent bands of the curved glass sheet differ from each other by lesser amounts than formerly, and the thermal gradient resulting as the glass sheet cools through the annealing range is reduced. The resulting stresses are reduced and the area of tension stress is displaced a greater distance inwardly from the peripheral margin than formerly.

The combination of heating the edge to a slightly cooler maximum temperature than formerly and increasing the temperature inboard of the edge to higher than that obtained by natural heating without the use of the stress modifying member and using the presence of the stress modifying member to moderate the relative cooling rates of the edge and a relatively wide strip inboard the edge provides a more gradual thermal gradient between the leading edge and the portion inboard of the edge as the glass sheet cools through the annealing range. This facilitates establishing a desirable stress pattern during the annealing cycle when the bent glass sheet is permitted to cool through the annealing range on its way to room temperature.

Example I

For bending pairs of glass sheets each one-eighth inch thick, 31 inches wide and 78 inches long on outline molds formed of rail 1½ inches high, ⅛ inch thick with a horizontal bar ½ inch wide and ⅛ inch thick attached to their bottom edges to form an inverted T in cross-section, the stress modifying member found most suitable incorporated a vertical member in the form of a metal plate 1/16 inch thick by 5 inches high by 38 inches long and a horizontal member in the form of a metal plate 1/16 inch thick by 4 inches wide and 38 inches long. The stress modifying member was located centrally of the mold longitudinal dimension. Laterally, the vertical member was about 2 inches laterally outside of the mold rail 18 in a vertical plane. The horizontal wall member 54 was located in a horizontal plane about 4 inches below the mold shaping surface and extended laterally inwardly from a corner it formed at the bottom of the vertical wall member to 2 inches inside the mold rail.

Temperature studies were made of two pairs of glass sheets, one pair bent on a mold free of a stress modifying member and the other pair bent on a mold incorporating the stress modifying member described in the previous paragraph. Both molds were conveyed through the same bending lehr at the same speed.

To accomplish this end thermocouples were located at the leading edge and two inches laterally inboard of the leading edge of the top sheet of each pair bent simultaneously. The maximum temperature differential between these areas for pairs bent on a mold not provided with a stress modifying member was slightly over 100 degrees Fahrenheit and only 40 degrees Fahrenheit, using a mold modified to incorporate the stress modifying member described hereinabove. The internal stresses as determined by polarized light strains calculated to equivalent stress was reduced from 1,280 pounds per square inch to 510 pounds per square inch.

Assuming a specific gravity of 7.5 for stainless steel and 2.5 for glass and a mean specific heat between room temperature and the glass deformation temperature of 0.138 gram calories per gram per degree centigrade for stainless steel and of about 0.28 gram calories per gram per degree centigrade for soda-lime glass (specific heat value for stainless steel derived from value reported for iron in "Handbook of Chemistry," Lange, 1944, Handbook Publishers, Inc., page 1505, and for soda-lime glass from "The Properties of Glass," Morey, 2nd edition, 1954, Reinhold Publishing Co., page 214) the relative thermal capacity of the stress modifying member can be calculated compared to that of the adjacent area of glass and the length of mold rail encompassed. The total mass of the stress modifying member employed in this experiment was about three times that of the enclosed glass area and about twice that of the length of mold rail encompassed by the stress modifying member.

The thermal capacity of the vertical wall member of the stress modifying member employed was substantially equal to that of the mold rail. The horizontal member of the stress modifying member had a thermal capacity greater than that of the adjacent glass.

The above experiment proved the advantage of having a stress modifying member whose thermal capacity is comparable with that of the adjacent mold rail in a skeleton mold. The experiment showed that locating the stress modifying member in spaced relation to the glass sheet edge portion whose cooling rate is retarded by contact with the mold rail during cooling but sufficiently close to the mold rail and the glass sheet portion and a band of glass extending inwardly from the mold contacting portion can reduce the maximum tension stresses induced in the glass sheets by widening the tension stress zone sufficiently to reduce the likelihood of breakage to substantially below that encountered with bent glass sheets produced on skeleton molds not provided with the safeguards of the present invention.

In the particular illustrative embodiment, the mass of the five inch high vertical member and the outer two inches of the four inch wide horizontal member retarded the natural cooling rate of the one-quarter inch thick edge surface and of the marginal band of about one-eighth to one-quarter inch exposed beyond the mold rail, whereas the inner two inches of the horizontal member retarded the cooling rate of a two inch band of glass immediately inward of the mold rail. This distribution of the mass of the stress modifying member relative to the mold rail and supported glass retarded the natural cooling rate of the exposed glass edge relatively more than that of the glass area inward of the edge. This disruption of natural cooling rates caused the improvement in stress distribution.

It is understood that a similar stress modifying member may be located in encompassing relation with the other side rail only or a pair of stress modifying members may be employed to encompass both side rails of the mold center section and still be within the teachings of the present invention. However, in order to insure economy of operation, it is expected that the number and lengths of stress modifying members employed be the minimum required to alleviate the problems enumerated above.

A detailed description of an illustrative embodiment has been provided for purposes of illustration rather than limitation and reference to the latter may be obtained by studying the accompanying claimed subject matter.

What is claimed is:

1. In the art of bending and annealing glass sheets wherein an unbent glass sheet is mounted above a mold having a skeleton shaping surface with an outline slightly smaller than the outline of the glass sheet after bending so that a narrow marginal area of the bent glass sheet including a longitudinally extending side edge portion is exposed while mounted on said mold,
   said glass sheet is heated to a temperature sufficient to deform the glass sheet and bend it into conformity with said shaping surface,
   and said bent glass sheet is subsequently cooled to below its annealing range,
   the improvement comprising maintaining a member having sufficient thermal capacity compared to adjacent mold parts and said supported glass sheet in close adjacency to said portion of said exposed glass sheet marginal area and a glass sheet area laterally inward thereof,
   with a relatively large proportion of its mass laterally outward of and adjacent the exposed glass edge portion to retard to a greater degree the cooling rate of the exposed glass edge compared to its cooling rate in the absence of said member,
   and a relatively small proportion of its mass adjacent each equivalent surface area of the glass sheet immediately inward of said edge portion to retard to a lesser degree the cooling rate of said glass sheet area laterally inward thereof compared to its cooling rate in the absence of said member as the glass sheet is cooled through its annealing range.

2. In the art of bending and annealing glass sheets wherein an unbent glass sheet is mounted above a mold having a skeleton shaping surface with an outline slightly smaller than the outline of the glass sheet after bending so that a narrow marginal area of the bent glass sheet including a longitudinally extending side edge portion is exposed while mounted on said mold,
   the glass sheet is conveyed transversely on said mold through a hot region maintained above the glass softening temperature at a rate such that said glass sheet is heated to a temperature sufficient to deform the glass sheet and bend it into conformity with said shaping surface,
   and said bent glass sheet is conveyed transversely on said mold through a region of decreasing temperature extending through the glass annealing temperature range to below the annealing range of the glass sheet at a rate of cooling sufficient to establish a stress pattern in the glass sheet including a zone having a tension stress substantially above 1,000 pounds per square inch in a portion adjacent said longitudinally extending side edge portion of said narrow marginal area when said narrow marginal area and a portion adjacent thereto are exposed,
   the improvement comprising maintaining a member having sufficient thermal capacity compared to adjacent mold parts, and said supported glass sheet in close adjacency to said portion of said exposed glass sheet marginal area and a glass sheet area laterally inward thereof with a relatively large proportion of its mass located transverse to the path along which the glass sheet is conveyed and adjacent the exposed glass edge portion to retard to a greater degree the cooling rate of the exposed glass edge compared to its cooling rate in the absence of said member, and a relatively small proportion of its mass adjacent each equivalent surface area of the glass sheet immediately inward of said edge portion to retard to a lesser degree the cooling rate of said glass sheet area laterally inward thereof compared to its cooling rate in the absence of said member as the glass sheet is cooled through its annealing range, whereby said maximum tension stress induced in the portion adjacent said narrow marginal area as a result of said cooling in the presence of said member is less than 1,000 pounds per square inch.

3. In the art of bending and annealing glass sheets wherein an unbent glass sheet is mounted on a mold having a skeleton shaping surface with an outline slightly smaller than the outline of the glass sheet after bending so that a narrow marginal area of the bent glass sheet including a longitudinally extending side edge portion is exposed while mounted on said mold, the glass sheet is conveyed transversely on said mold through a hot region maintained above the glass softening temperature at a rate such that said glass sheet is heated to a temperature sufficient to deform the glass sheet and bend it into conformity with said shaping surface, and said bent glass sheet is conveyed transversely on said mold through a region of decreasing temperature extending through the glass annealing range to below the annealing range of the glass sheet at a rate of cooling sufficient to establish a stress pattern in the glass sheet, the improvement comprising maintaining a heat absorbing member having a substantially vertically disposed portion and a substantially horizontally disposed portion in fixed confronting relation to the exposed longitudinally extending side edge portion of said glass edge and a glass sheet area laterally inward thereof, said vertically disposed portion having sufficient thermal capacity to retard the cooling rate of the exposed glass edge relatively more than said horizontally disposed portion retards the cooling rate of the surface area inward of the exposed glass edge as the glass sheet is cooled through its annealing range.

4. In the art of bending and annealing glass sheets wherein an unbent glass sheet is mounted on a mold having a skeleton shaping surface with an outline slightly smaller than the outline of the glass sheet after bending so that a narrow marginal area of the bent glass sheet including a longitudinally extending side edge portion is exposed while mounted on said mold, the glass sheet is conveyed transversely on said mold through a hot region maintained above the glass softening temperature at a rate such that said glass sheet is heated to a temperature sufficient to deform the glass sheet and bend it into conformity with said shaping surface, and said bent glass sheet is conveyed transversely on said mold through a region of decreasing temperature extending through the glass annealing range to below the annealing range of the glass sheet at a rate of cooling sufficient to establish a stress pattern in the glass sheet, the improvement comprising retarding the cooling rate of the exposed longitudinally extending side edge portion of said glass edge and the glass sheet area inward thereof as the glass sheet is cooled through its annealing range, by maintaining a heat absorbing member in fixed confronting relation to said exposed glass edge and said glass sheet area inward thereof with a relatively large proportion of its mass adjacent said edge and a relatively small proportion of its mass adjacent said glass sheet area inward thereof, the cooling rate of the exposed glass edge being retarded sufficiently more than the cooling rate of the glass sheet area inward thereof by the presence of said heat absorbing member to produce a bent, annealed glass sheet having an edge stressed in compression and a glass sheet portion displaced more than one-half inch from said edge having a maximum tension stress less than 1,000 pounds per square inch.

References Cited by the Examiner

UNITED STATES PATENTS

| | | | |
|---|---|---|---|
| 2,893,170 | 7/57 | Carson et al. | 65—107 |
| 2,897,632 | 8/59 | Fowler et al. | 65—103 |
| 2,903,825 | 9/59 | Richardson | 65—288 |
| 2,941,336 | 6/60 | Devore | 65—288 |
| 2,991,591 | 7/61 | Gabor et al. | 65—115 |

FOREIGN PATENTS 1,146,247  5/57  France.

DONALL H. SYLVESTER, *Primary Examiner.*